(12) United States Patent
Roy et al.

(10) Patent No.: US 11,488,102 B2
(45) Date of Patent: Nov. 1, 2022

(54) METHOD AND APPARATUS FOR IMAGE CAPTURING INVENTORY SYSTEM

(71) Applicant: Switch, Ltd., Las Vegas, NV (US)

(72) Inventors: Rob Roy, Las Vegas, NV (US); Brandon Hjelstrom, Las Vegas, NV (US)

(73) Assignee: Switch, Ltd., Las Vegas, NV (US)

( * ) Notice: Subject to any disclaimer, the term of this patent is extended or adjusted under 35 U.S.C. 154(b) by 0 days.

(21) Appl. No.: 16/737,838

(22) Filed: Jan. 8, 2020

(65) Prior Publication Data
US 2020/0219044 A1 Jul. 9, 2020

Related U.S. Application Data

(60) Provisional application No. 62/789,931, filed on Jan. 8, 2019.

(51) Int. Cl.
| | | |
|---|---|---|
| *G06Q 10/08* | (2012.01) | |
| *H04N 5/232* | (2006.01) | |
| *H04N 5/225* | (2006.01) | |

(52) U.S. Cl.
CPC ......... *G06Q 10/087* (2013.01); *H04N 5/2252* (2013.01); *H04N 5/23299* (2018.08)

(58) Field of Classification Search
CPC . G06Q 10/087; H04N 5/23299; H04N 5/2252
USPC .......................................................... 705/28
See application file for complete search history.

(56) References Cited

U.S. PATENT DOCUMENTS

| | | | | |
|---|---|---|---|---|
| 1,535,225 A | * | 4/1925 | Hays ...................... | G03B 27/66 |
| | | | | 396/145 |
| 3,220,325 A | * | 11/1965 | Macomber ............... | G03B 7/16 |
| | | | | 396/166 |
| 3,659,932 A | * | 5/1972 | Bach ...................... | G03B 19/18 |
| | | | | 352/242 |
| 4,130,357 A | * | 12/1978 | Erlichman ............... | G03B 9/28 |
| | | | | 396/483 |
| 5,673,082 A | * | 9/1997 | Wells ...................... | G01S 7/493 |
| | | | | 348/139 |
| 6,091,792 A | * | 7/2000 | Hill ........................ | G06M 9/00 |
| | | | | 250/222.1 |
| 6,192,196 B1 | * | 2/2001 | Keller .................... | G03B 7/099 |
| | | | | 396/20 |
| 9,817,298 B1 | * | 11/2017 | Dhall .................... | G03B 17/02 |
| 10,578,953 B1 | * | 3/2020 | Hallett ............... | F16M 11/2092 |
| 2003/0155730 A1 | * | 8/2003 | Chu ..................... | F16M 11/046 |
| | | | | 280/47.35 |
| 2006/0204128 A1 | * | 9/2006 | Silverstein ............. | G06T 5/008 |
| | | | | 382/275 |

(Continued)

OTHER PUBLICATIONS

Glzmodo, Samsung NX1: A 4K Video Chomping, 28-Megapixel Camera in a Compact Body, Mario Aguilar, Sep. 16, 2014 (Year: 2014).*

*Primary Examiner* — Florian M Zeender
*Assistant Examiner* — Nicole Elena Bruner
(74) *Attorney, Agent, or Firm* — Weide & Miller, Ltd.

(57) ABSTRACT

Disclosed is a system and methods for making and using an image capturing apparatus for a user to rapidly take and catalogue inventory and equipment. The system is useful for tracking the shelf-life and value of the inventory and equipment. The system allows for the proper setup and function of certain types of the inventory and equipment, and for the recordation and storage of the inventory/equipment information in a computer database.

18 Claims, 15 Drawing Sheets

(56) References Cited

U.S. PATENT DOCUMENTS

| | | | |
|---|---|---|---|
| 2007/0251408 A1* | 11/2007 | Fletcher | B61B 13/02 |
| | | | 104/247 |
| 2011/0199183 A1* | 8/2011 | Marsden | G07C 9/00563 |
| | | | 340/5.52 |
| 2012/0039593 A1* | 2/2012 | Yang | G03B 15/05 |
| | | | 396/175 |
| 2018/0098029 A1* | 4/2018 | Cassini | H04N 5/23296 |
| 2018/0174357 A1* | 6/2018 | Priest | G06T 15/205 |
| 2019/0025849 A1* | 1/2019 | Dean | G05D 1/0094 |
| 2019/0260943 A1* | 8/2019 | Strobert, Jr. | H04N 5/2328 |
| 2020/0098208 A1* | 3/2020 | Sun | G07C 9/257 |

* cited by examiner

METHOD AND APPARATUS FOR IMAGE CAPTURING INVENTORY SYSTEM

BACKGROUND

The disclosed embodiments relate to a system for rapidly capturing and storing images of inventory, extracting information from the images for inventory, records keeping, and equipment analysis, and/or equipment and methods of making and using the same.

It is well-known that retail stores, warehouses, data centers and co-location facilities keep inventory of products and equipment. In many facilities, individuals record inventory by hand-writing or by scanning barcodes. These processes for recording inventory may be time consuming when the quantity of inventory is large, or when inventory or equipment is volumetrically large and/or heavy. The inventory recording process may consume even more time when more details about the inventory items is desired.

It is known that inventory and equipment for retail stores, warehouses, data centers and co-location facilities is commonly stored in rows on shelves. For data centers and co-location facilities in particular, servers and other electronic equipment is stored on shelves in cabinets having open or openable front and rear sides to allow for the flow of air into and through the equipment for cooling purposes. One particular entity having a need for servers and electronic equipment may have a large variety of makes and models of differing age, value, level of performance, etc. stored in one, a few, or many cabinets. The deployment process for this equipment may take many hours, and due to the sensitive nature of this equipment it is often preferable that it be left secure and untouched after deployment until and unless service, repair, or replacement is necessary.

The life of the equipment is dependent upon many variables such as cooling methods, powering methods, and proper installation. Equipment may be left in a data center or co-location facility physically located far distances from the owner of the equipment. For large deployments, the equipment's value may be in the thousands or millions. A need exists for owners of such deployments to quickly catalogue as much data as possible about the equipment deployed, where it is deployed, how it is deployed, and how its function and value changes over time in a manner which drastically reduces the number of man-hours needed for the inventory recording, tracking, and monitoring processes.

SUMMARY

The present invention provides a system of methods and apparatus for rapidly recording, cataloguing, and monitoring inventory and equipment, particularly for retail stores, warehouses, data centers, and/or co-location facilities.

In one aspect an image capturing apparatus is provided for a user to rapidly record and catalogue the inventory. The apparatus is configured for ease of use and transportability. The system also includes software programmed to identify labels, markings, barcodes, and physical features of the inventory/equipment such as lights, plugs, switches, and a database that may be accessed remotely by the user to review the data related to their inventory. The data may include but is not limited to dates and times of deployment; the methods of deployment, installation, and equipment function; makes and models of equipment; physical locations; equipment values and depreciation; identification of properly and improperly functioning equipment; age of equipment and indicators of equipment due for replacement; brand names; product names; lights; ports; switches and their positioning; buttons; bar codes; product numbers; serial numbers; dates of manufacture; expiration dates; mass and/or volumetric data; ingredient lists; nutritional facts; pricing information; weights; logos; telephone numbers; email addresses; website addresses; physical addresses; manufacturer information; indications of hazards; shelf-life indicators; heat generation and dispersal patterns; and/or warnings related to the equipment.

The captured images and retrieved and stored data related to the inventory are presented to the user with a remotely accessible, easy to navigate, detailed user interface.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF EMBODIMENTS

The present invention generally provides a system and methods for making and using an image capturing apparatus for a user to rapidly take and catalogue inventory, to keep track of the inventory's shelf-life, to ensure proper setup and function of the inventory, and to record and store inventory information in a computer database.

Figure 1:
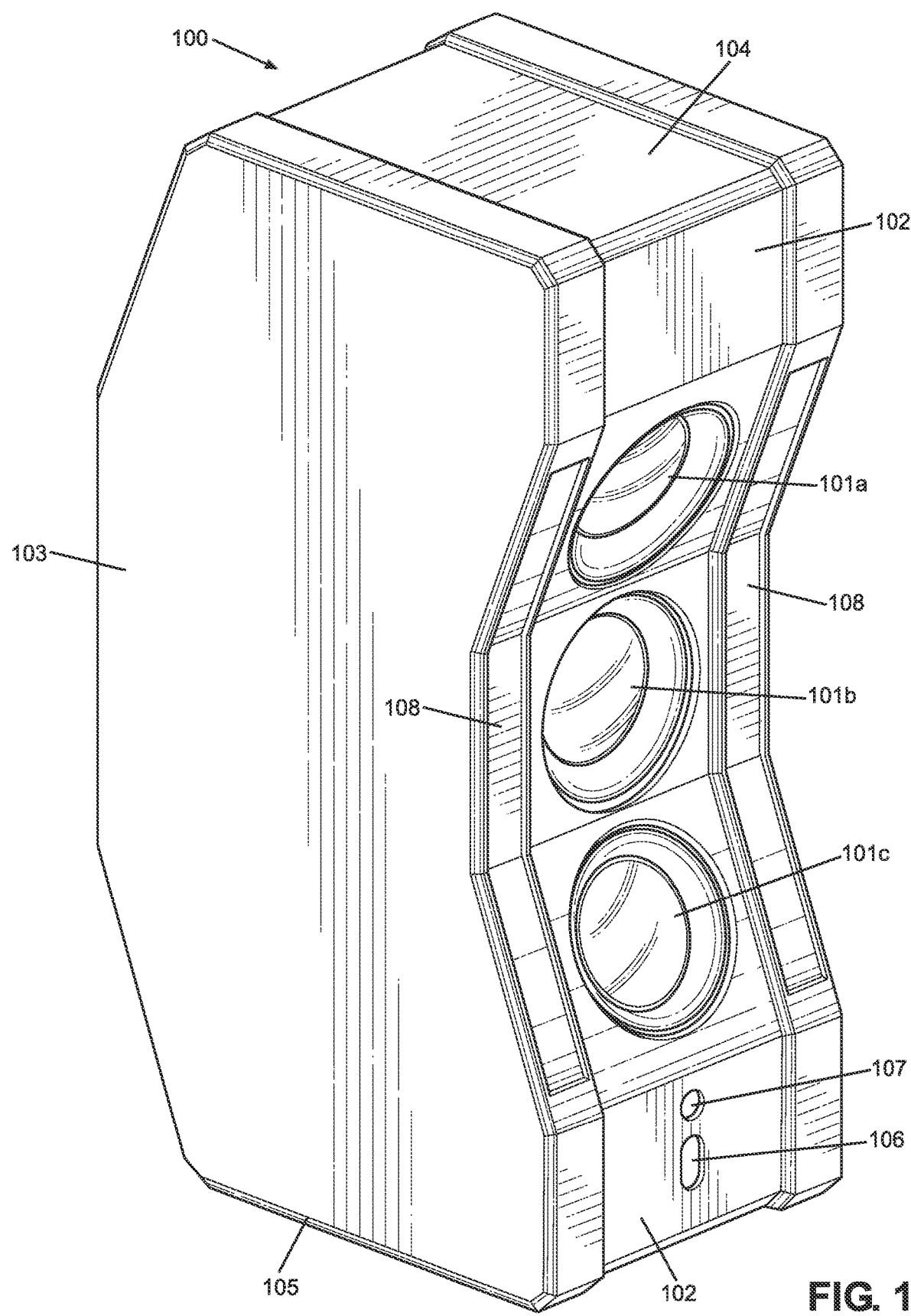
FIG. 1 illustrates a perspective view of a camera unit according to a first embodiment of the present invention.

FIG. 1 illustrates a first embodiment of camera unit 100. The camera unit 100 comprises up to three cameras (101a, 101b, 101c) mounted within and protected by a plurality of camera housing panels. In the FIG. 1 embodiment, three cameras are used for the camera unit 100, however other embodiments may allow for a single camera or a pair of cameras. In the embodiment of FIG. 1, each of the cameras 101a, 101b, and 101c is a 28 MP camera, however it should be appreciated that lower or preferably higher image quality cameras may be used as camera technology advances. Additionally, each of the cameras 101a, 101b, 101c has a 20-24 mm lens. In an alternative embodiment, 8 mm lenses are used. It should be appreciated that lenses of different focal lengths may be used as needed for the particular width of view for the image capturing task at hand. The camera unit's housing comprises a plurality of front-side panels 102, a pair of side panels 103, top panel 104, bottom panel 105, and a plurality of back-side panels. Positioned on the front-side panels 102 are openings for vertical positioning laser 106 and horizontal positioning laser 107. The vertical positioning laser 106 projects a vertical line laser beam while the horizontal positioning laser 107 projects a horizontal line laser beam. Vertical positioning laser 106 and horizontal positioning laser 107 are activated during use of the camera unit 100 to assist the user with properly positioning the camera unit 100 in front of the cabinet or shelf being imaged for inventory.

Positioned on the surface of front-side panels 102 are grooves 108 adjacent both sides of the cameras 101a, 101b, and 101c. As shown in FIG. 1, the grooves 108 are vertical indentations in front-side panels 102. Grooves 108 allow for LED strips (not shown) to be placed within the indentations. The LED strips are activated during use of the camera unit 100 to project bright light onto the target of the image capture, thereby illuminating the surface of the image capture target to ensure a bright image is captured.

Figure 2:
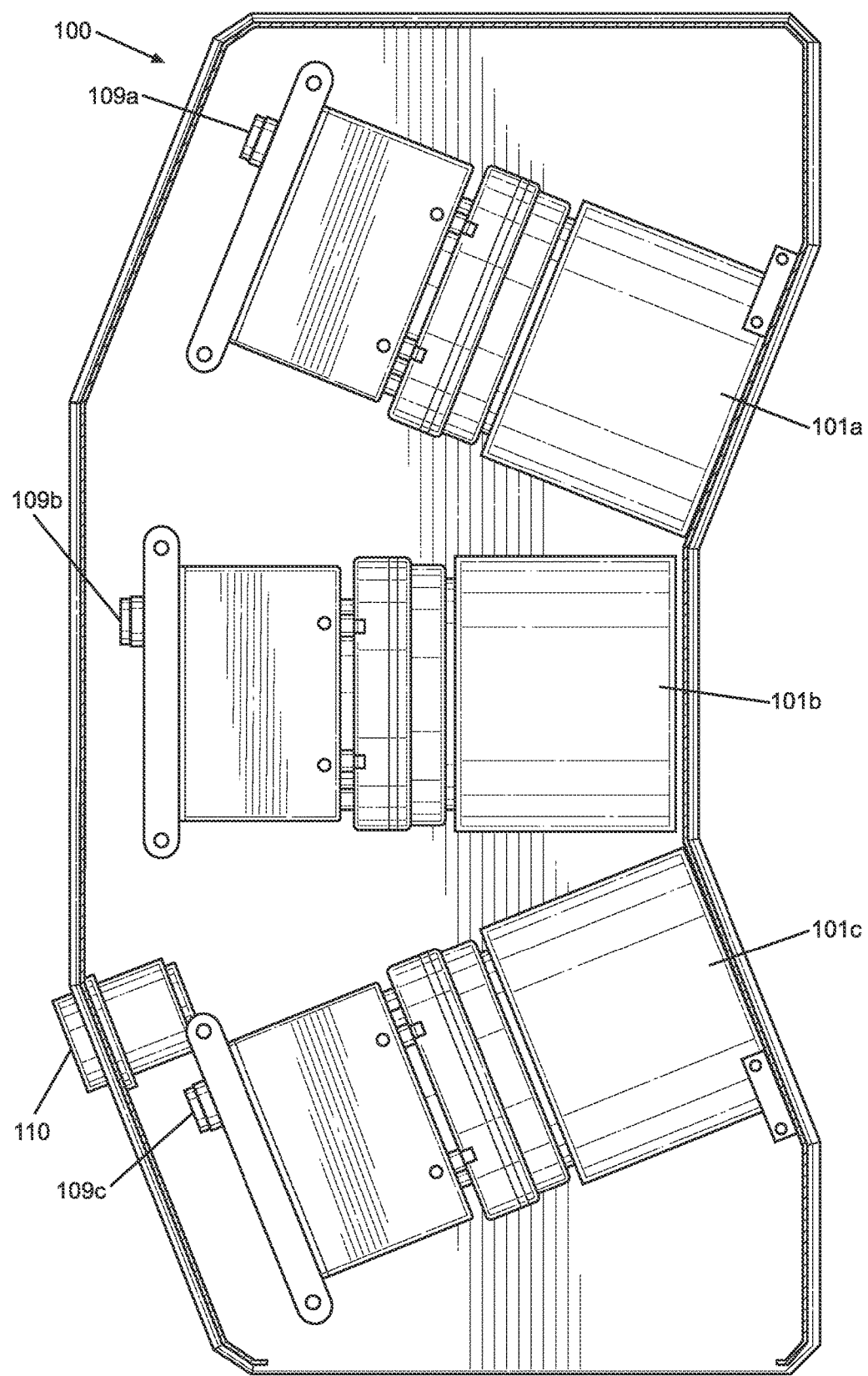
FIG. 2 illustrates a side, cut-out view of the camera unit of FIG. 1.

FIG. 2 illustrates the internal configuration of components of the camera unit 100 within the camera's housing. In the three camera embodiment of FIG. 2, the middle camera 101b is configured to be substantially parallel with the floor when in use. Top camera 101a and bottom camera 101c are angled at +/−21.5° relative to the middle camera 101b, respectively. This positioning of the cameras allows the camera unit 100 to capture three images that are then stitched by camera system software 700 into one, flat, high-definition image showing the entire height of the cabinet or shelf being imaged for inventory. It ought to be appreciated that other angles may be used as needed. The stitched image may then be downloaded onto the camera system's hard drive, transferred to an off-site hard drive, and/or uploaded to cloud storage for extracting and processing data.

FIG. 2 shows camera ports 109a, 109b, and 109c for inputting power and data cabling positioned at the rear ends of cameras 101a, 101b, and 101c respectively. The camera ports 109a, 109b, and 109c allow for power and data cables to be connected to each of the respective cameras to provide power to the cameras, send input signals to the cameras, and retrieve captured image data from the cameras. Power and data cables plugged into camera ports 109a, 109b, and 109c are installed into the camera housing through housing port 110.

Figure 3:
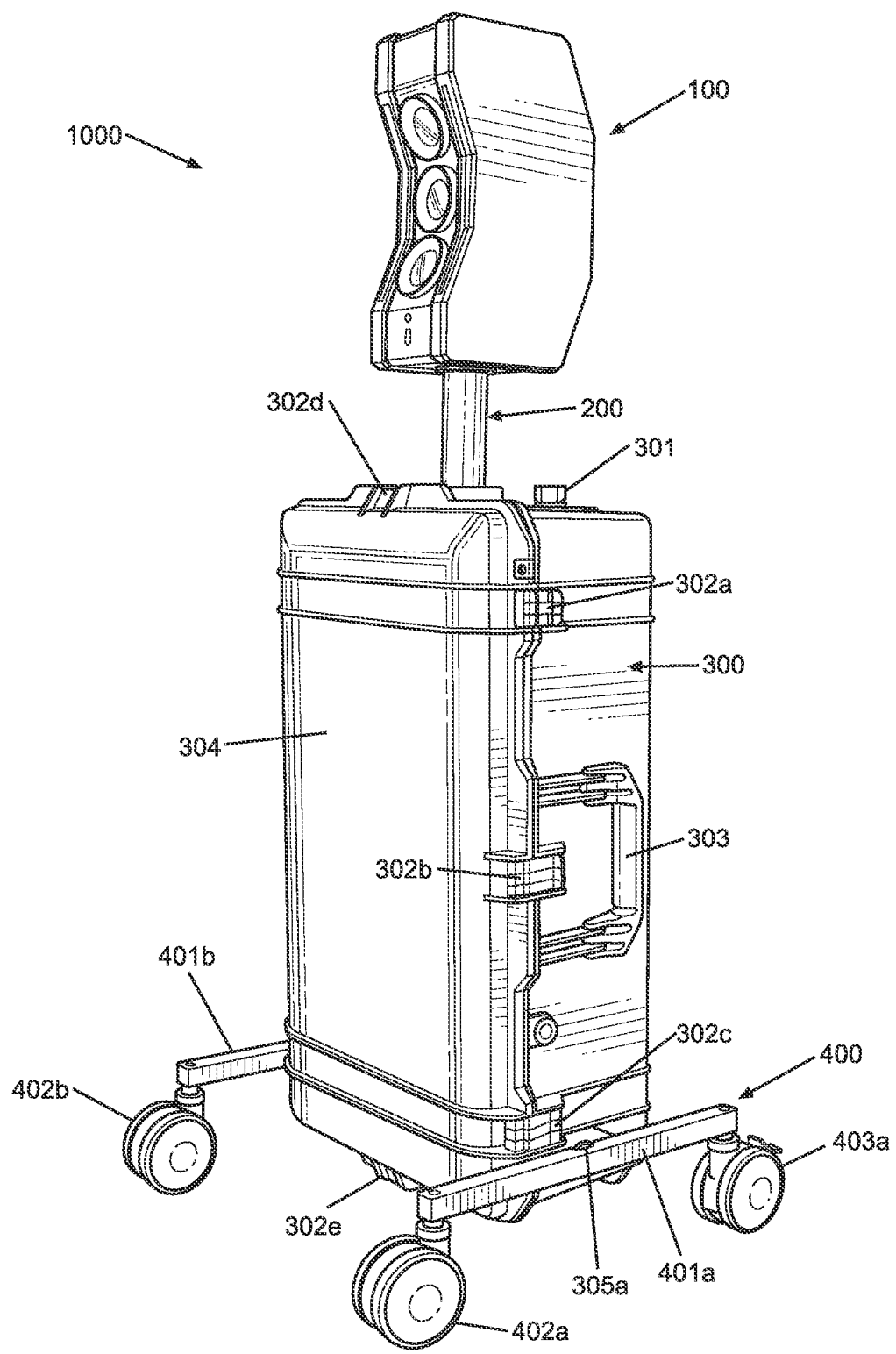
FIG. 3 illustrates a perspective view of a rapid inventory imaging system according to the first embodiment of the present invention.

FIG. 3 illustrates the fully assembled rapid inventory imaging system 1000. Camera unit 100 is removably mounted on the camera extension 200. An opening in the bottom panel 105 is threaded to form a female receiving opening for the camera unit 100. The camera extension 200 is a stainless steel, cylindrical, telescoping tube threaded at one end and configured to mate with the receiving opening for the camera unit 100 in a male-female connection mechanism. The camera extension 200 telescopes to provide the user with height variability when the camera unit 100 is in use. Although the camera extension 200 made with stainless steel in this embodiment, it should be appreciated that any other suitable materials may be used. The opposite end of the camera extension 200 is removably mounted in the suitcase carrier 300. The suitcase carrier 300 is a modified suitcase with a hard plastic shell suitable for protecting the camera unit 100 when the camera unit is removed and placed inside the suitcase carrier. The suitcase carrier 300 is configured to allow for quick assembly/disassembly of the rapid inventory imaging system 1000. This allows the rapid inventory imaging system 1000 to be securely and safely transferred between locations, shipped by air or ground transportation, or carried by a user.

Suitcase carrier 300 is equipped with suitcase cable port 301. The suitcase cable port 301 allows power and data cabling to extend from the inside of the suitcase carrier 300, through the housing port 110, to the camera ports 109a, 109b, and 109c. Suitcase carrier 300 has latches 302a, 302b, 302c, 302d, and 302e to securely fasten the suitcase carrier lid 304 in a closed configuration. Suitcase carrier handle 303 allows the user to pick up and carry the suitcase carrier 300. Suitcase carrier magnets 305a and 305b are affixed to the outer side surface near the bottom end of the suitcase carrier 300 to removably attach a wheel assembly 400 to the suitcase carrier 300. Wheel assembly 400 is comprised of wheel axles 401a and 401b, wheel pairs 402a and 402b, and wheel stoppers 403a and 403b. Wheel axles 401a and 401b each have a pair of wheels, 402a and 402b respectively, fixedly inserted at their ends. Each of the wheel pairs 402a and 402b are equipped with stoppers 403a and 403b respectively. Stoppers 403a and 403b may be stepped on with a user's foot or otherwise similarly manipulated to move between an unlocked and locked position and vice versa. Wheel axles 401a, 401b each have an axle magnet 405a, 405b attached at a midpoint that bisects the length of the wheel axle between the wheels. To assemble the rapid inventory imaging system 1000, the axle magnets 405a, 405b are positioned adjacent to the suitcase carrier magnets 305a, 305b so that a strong magnetic bond releasably attaches the wheel axles 401a, 401b to the suitcase carrier 300. Attaching the wheel axles 401, 401b to the suitcase carrier 300 provides the rapid inventory imaging system 1000 with a more stable base. When the camera unit 100 and camera extension 200 are removed from and assembled on the suitcase carrier 300, the apparatus' center of gravity is relatively high, making the apparatus more prone to tipping over and damaging the camera unit 100. Attaching the wheel assembly 400 mitigates this tipping risk while also providing the added benefit of allowing the rapid inventory imaging system 1000 to be pushed along a floor. Pushing the system along a floor increases the speed at which the rapid inventory imaging system 1000 can be repositioned to capture the next image of the target cabinet or shelf.

Figure 4:
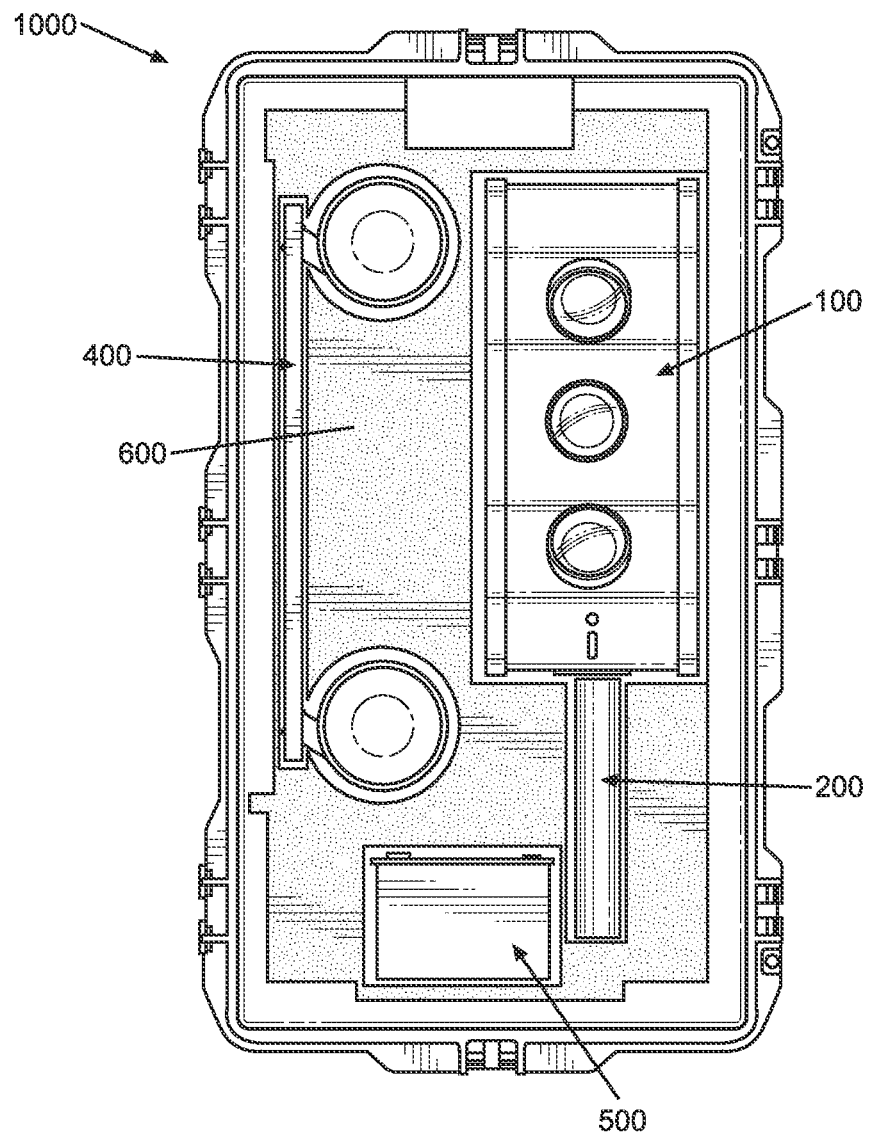
FIG. 4 illustrates a front view of an open suitcase carrier housing the parts of the rapid inventory imaging system of FIG. 3.

FIG. 4 illustrates an embodiment of an internal configuration of the parts of the rapid inventory imaging system 1000 prior to assembly of the assembled configuration illustrated in FIG. 3. FIG. 4 shows the camera unit 100, camera extension 200, wheel assembly 400, and the power and computing unit 500 are held in place within the suitcase carrier 300 by foam 600. Foam 600 is a unitary piece of soft foam material with cutout portions contoured to the dimensions of the rapid inventory imaging system 1000 parts. While FIG. 4 shows a particularly configuration of the parts housed within the suitcase carrier 300, it should be appreciated many other distributions of parts may be created by cutting out portions of the foam 600, as long as the cutout portions are suitable for securely and releasably fixing the parts within the suitcase carrier 300, while providing the intended benefit of preventing the parts from moving or breaking as the suitcase carrier 200 is manually manipulated, dropped, struck by an impact force, etc.

One particular method of using the embodiment of the rapid inventory imaging system 1000 illustrated in FIGS. 1-4 is described as follows: A user takes possession of the un-assembled rapid inventory imaging system 1000 as depicted in FIG. 4. The user typically intends to take inventory of some quantity of goods or equipment, such as canned or boxed foods at a grocery store, boxed goods at a retail store, or computer servers and equipment in a data center facility. Likewise, the intended imaging targets may be shelves of goods or equipment or electronic equipment in server cabinets of a data center. The user opens the suitcase carrier 300 by unlatching the latches 302*a*-302*e*. The user removes the camera unit 100, the extension 200, and the wheel assembly 400 from the protective foam 600 of suitcase carrier 300. The power and computing unit 500 remains within the suitcase carrier 300. The user attaches the extension 200 to the camera unit 100 by screwing one end of the extension into the camera unit or by other suitable attachment mechanisms. The user attaches the other end of the extension 200 to the suitcase carrier 300 by screwing the other end of the extension into the suitcase carrier or by other suitable attachment mechanisms. The assembled rapid inventory imaging system 1000, as depicted in FIG. 3, is placed on a floor adjacent to the imaging target. The system 1000 is guided into an optimal position where the camera unit lens 101*b* is approximately 28-32 inches away from the imaging target by pushing the system 1000 across the floor on wheel pairs 402*a* and 402*b*.

The user powers on the assembled rapid inventory imaging system 1000 to cause power to be provided from the power and computing unit 500 to the camera unit 100. Powering on the system 1000 also activates a Wi-Fi signal from the power and computing unit 500's antenna. The user controls the camera's operation using an application interface with camera system software 700. The application interface may be downloaded onto the user's cellular phone or may come pre-installed on a cellular phone or other hardware device provided with the system 1000. When the rapid inventory imaging system 1000 is powered on and positioned approximately 28-32 inches from the imaging target, the user may instruct the camera system software to activate the vertical positioning laser 106 and horizontal positioning laser 107. The positioning lasers project vertical and horizontal streams of light onto the target surface. If the vertical positioning laser is positioned substantially away from a midpoint of the imaging target's width, the user may reposition the entire system 1000 by pushing the system into proper position on the floor. If the horizontal positioning laser is positioned substantially away from imaging target's height, the user may reposition the camera unit 100 by raising or lowering the telescoping camera extension 200 until the camera unit is in proper position relative to the imaging target. When the lasers indicate the system 1000 is properly positioned, the user locks the camera extension 200 at the desired height and presses the wheel stoppers 403*a* and 403*b* into a locked position to lock the wheel pairs 402*a* and 402*b* in place, thereby preventing the system from moving on the floor.

After positioning the system 1000 in the desired location relative to the imaging target, the user inputs signals to instruct the camera system software 700 to capture the image of the target. When the camera system software 700 receives the signal to capture the image, the software instructs the lenses of cameras 101*a*, 101*b*, and 101*c* to auto-focus. At the same time the software instructs the LED strips on grooves 108 to project a bright light onto the target image's surface. After the lenses are focused and the target image is illuminated, the camera 101*a* captures a still image of the imaging target and sends the captured image data to the hard drive of the power and computing unit 500. After the camera 101*a* captures an image, the camera 101*b* captures a still image of the imaging target and sends the captured image data to the hard drive of the power and computing unit 500. After the camera 101*b* captures an image, the camera 101*c* captures a still image of the imaging target and sends the captured image data to the hard drive of the power and computing unit 500. All three cameras capture an image while the surface is imaging target is illuminated by the LED strips. While this embodiment describes the particular order of the cameras capturing their respective images, one should appreciate that any order of the cameras capturing an image is suitable to accomplish the image capturing task. Additionally, while this embodiment describes the use of three separate cameras to capture three different angles of the imaging target, other embodiments may use a single camera that translates vertically or horizontally to capture multiple images at different angles of the imaging target, or a pair of cameras to accomplish the same. In embodiments where multiple cameras are used, the cameras preferably capture their respective images in sequential order to save power due to the large amount of power required by the camera(s) to initiate the image capture.

When the power and computing unit 500 receives the image data taken by the camera unit 100, the camera system software 700 processes the images to compile them into a single, high-definition image that fully captures the height and width of the imaging target. In some embodiments of the system 1000's method of use, imaging targets may be 4 feet to 9 feet in height. In some embodiments of the system 1000's method of use, imaging targets may be 1 foot to 15 feet in width. In a preferred embodiment of the system 1000's method of use, the imaging target is of the approximate dimensions of server cabinets used to store servers and other electronics equipment in a data center or co-location facility. The camera system software 700 processes the images by stitching the plurality of images into a single, seamless, high definition image without distortion of the imaging target's dimensions due to the plurality of angles captured. When the camera system software 700 completes the image stitching process and compiles the multiple image angles into a single composite image, this image is then stored in the memory of the power and computing unit 500. As an alternative, or in addition to storing the composite image in the memory of the power and computing unit 500, the image may be uploaded into cloud storage. As an alternative, or in addition to storing the composite image in the memory of the power and computing unit 500, the image may be sent to and stored on the user's cellular phone. As an alternative, or in addition to storing the composite image in the memory of the power and computing unit 500, the image may be sent to and stored on any external hard drive of the user chooses.

In a preferred embodiment of the rapid inventory imaging system 1000, the camera system software 700 scans the composite image for identifying information. Identifying information may include but is not limited to brand names, product names, bar codes, product numbers, serial numbers, dates, expiration dates, mass and/or volumetric data, ingredient lists, nutritional facts, pricing information, weights, logos, telephone numbers, email addresses, website addresses, physical addresses, manufacturer information, indications of hazards, shelf-life indicators, warning labels, etc. The camera system software 700 identifies, captures, and sorts this information into a stored database unique to the user inputting the data by capturing the target images. In an embodiment wherein the camera system software 700 identifies, captures, and sorts information related to servers and computer equipment in a data center or co-location facility, the user may then remotely access the information it has captured and stored to keep track of the type and location of equipment it has deployed in a particular location; to assess the value and depreciation of value of its equipment; to identify properly and improperly installed equipment; to identify properly and improperly functioning equipment; to identify aging equipment due for replacement; to find and/or locate a particular piece of equipment; and/or to track brand names, product names, bar codes, product numbers, serial numbers, dates, expiration dates, mass and/or volumetric data, ingredient lists, nutritional facts, pricing information, weights, logos, telephone numbers, email addresses, website addresses, physical addresses, manufacturer information, indications of hazards, shelf-life indicators, and/or warnings related to its equipment.

Figure 5:
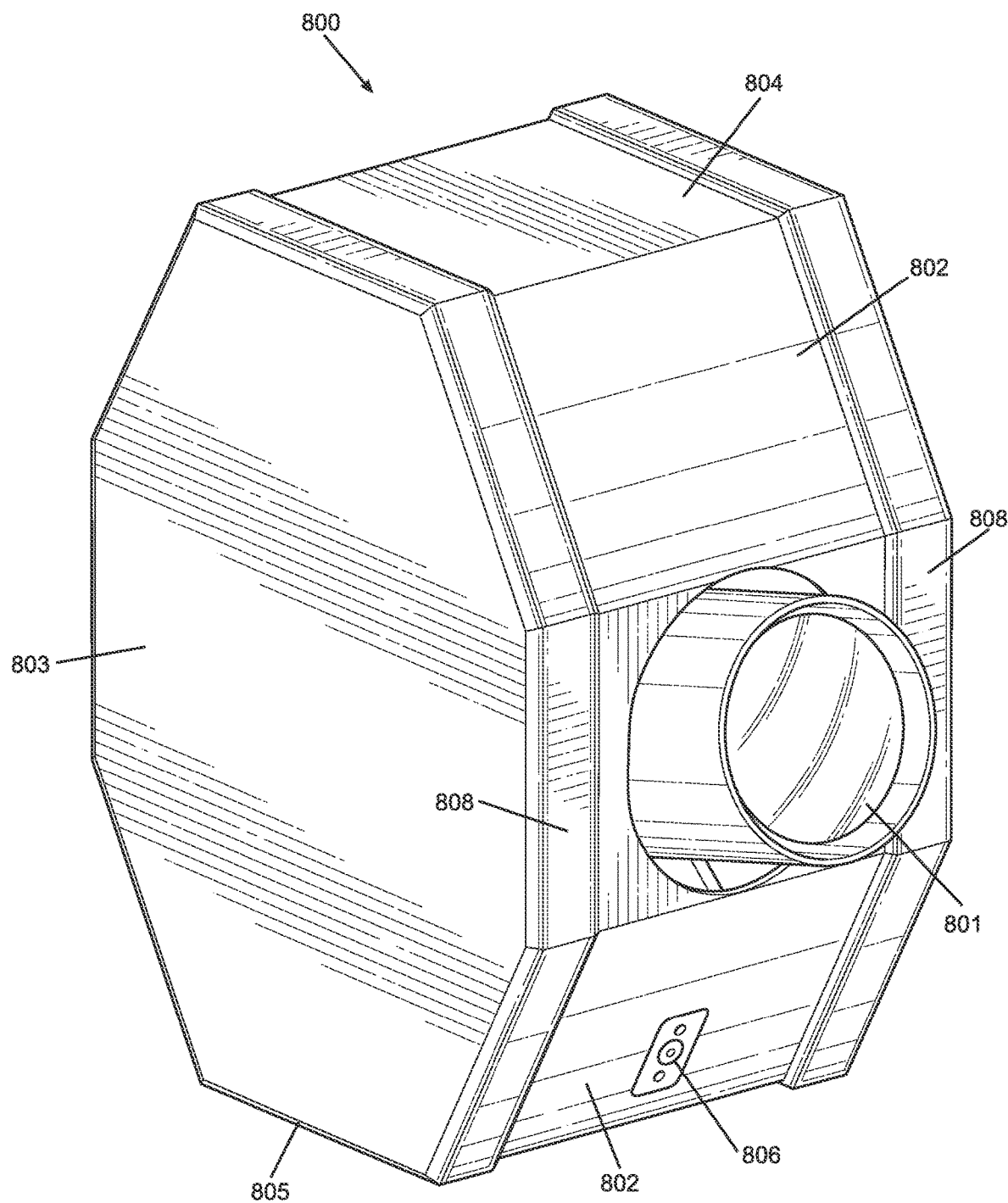
FIG. 5 illustrates a perspective view of a camera unit according to a second embodiment of the present invention.

FIG. 5 illustrates a second, preferred embodiment of camera unit 800. The camera unit 800 comprises a single camera 801 mounted within and protected by a plurality of camera housing panels. In the embodiment of FIG. 5, the camera 801 is a 28 MP camera, however it should be appreciated that lower or preferably higher image quality cameras may be used as camera technology advances. Additionally, the camera 801 has a 20-24 mm lens. In an alternative embodiment, 8 mm lenses are used. It should be appreciated that lenses of different focal lengths may be used as needed for the particular width of view for the image capturing task at hand. The camera unit's housing comprises a plurality of front-side panels 802, a pair of side panels 803, top panel 804, bottom panel 805, and a plurality of back-side panels. Positioned on the front-side panels 802 is an opening for positioning laser 806. The positioning laser 806 projects a vertical line laser beam and a horizontal line laser beam. Positioning laser 806 is activated during use of the camera unit 800 to assist the user with properly positioning the camera unit 800 in front of the cabinet or shelf being imaged for inventory.

Positioned on the surface of front-side panels 802 are grooves 808 adjacent both sides of the camera 801. As shown in FIG. 5 the grooves 808 are vertical indentations in front-side panels 802. Grooves 808 allow for LED strips (not shown) to be placed within the indentations. Alternatively, the surface area of front-side panels 802 may be used to place an array of LED lights (not shown). The LEDs are activated during use of the camera unit 800 to project bright light onto the target of the image capture, thereby illuminating the surface of the image capture target to ensure a bright image is captured which allows for quicker capture and processing of the image.

Figure 6:
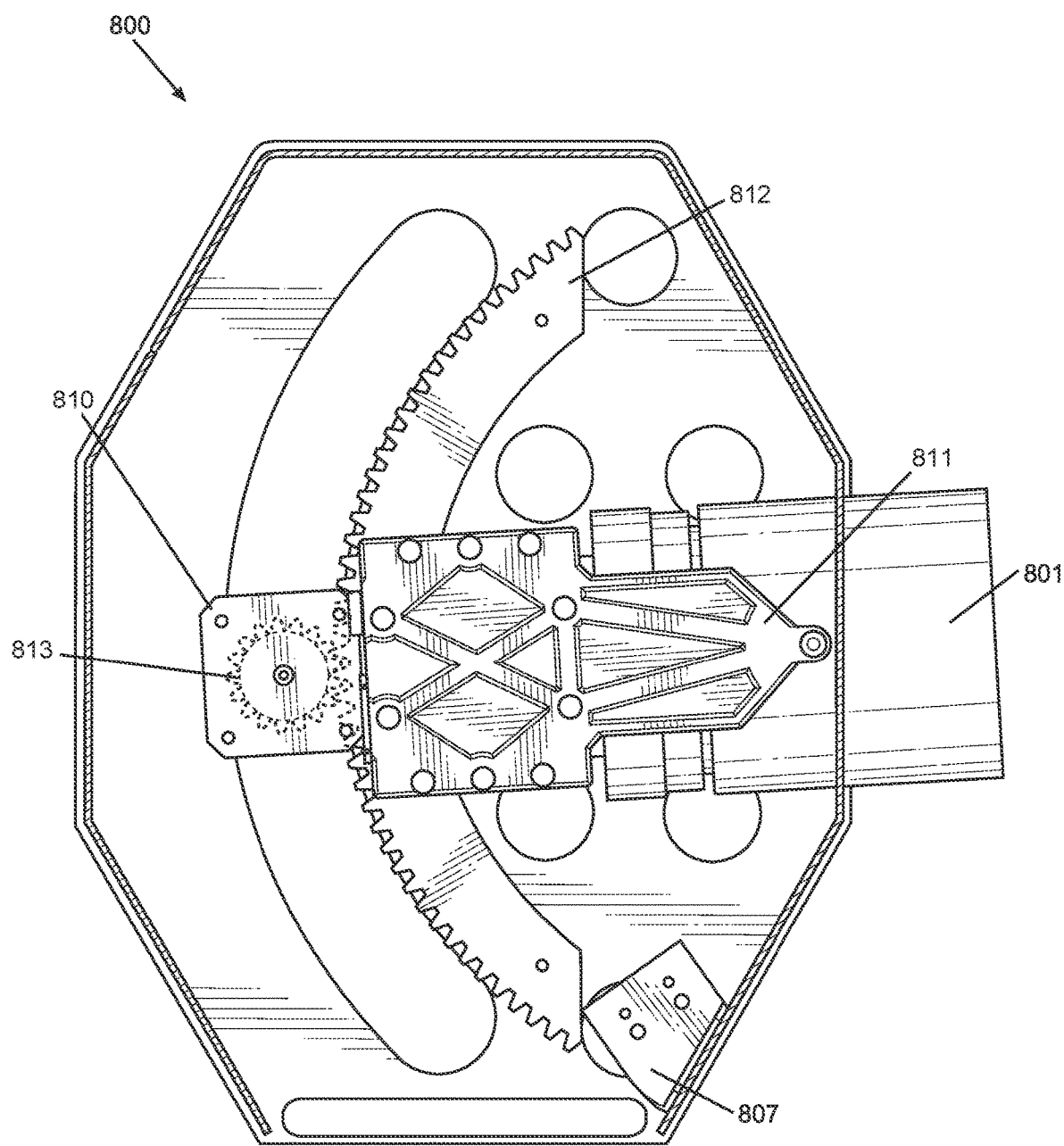
FIG. 6 illustrates a side, cut-out view of the camera unit of FIG. 5.

FIG. 6 illustrates the internal configuration of components of the camera unit 800 within the camera's housing. In the embodiment of FIG. 6, the camera 801 is affixed to camera mount 811. The camera mount 811 allows for the camera 801 to be removably affixed within the camera unit 800 so the camera 801 may be removed for repair or replacement. At the rear of the camera mount 811 is gear housing 810. Gear housing 810 is fixedly attached to the camera mount 811. Within the gear housing 810 is gear 813. Gear 813 has teeth which mesh with the teeth of track 812, to guide the camera along an arced path upon activation of the camera unit 800. The arced path allows the camera to rotate+/−21.5 degree. relative to a horizontal axis parallel to the floor. This configuration of the camera allows the camera unit 800 to capture one continuous panoramic image along an arced path that is then flattened by camera system software 700 into one, flat, high-definition image showing the entire height of the cabinet or shelf being imaged for inventory. It ought to be appreciated that other angles may be used as needed. The flattened image may then be downloaded onto the camera system's hard drive, transferred to an off-site hard drive, and/or uploaded to cloud storage for extracting and processing data. FIG. 6 also illustrates the inner component 807 of positioning laser 806.

Figure 7:
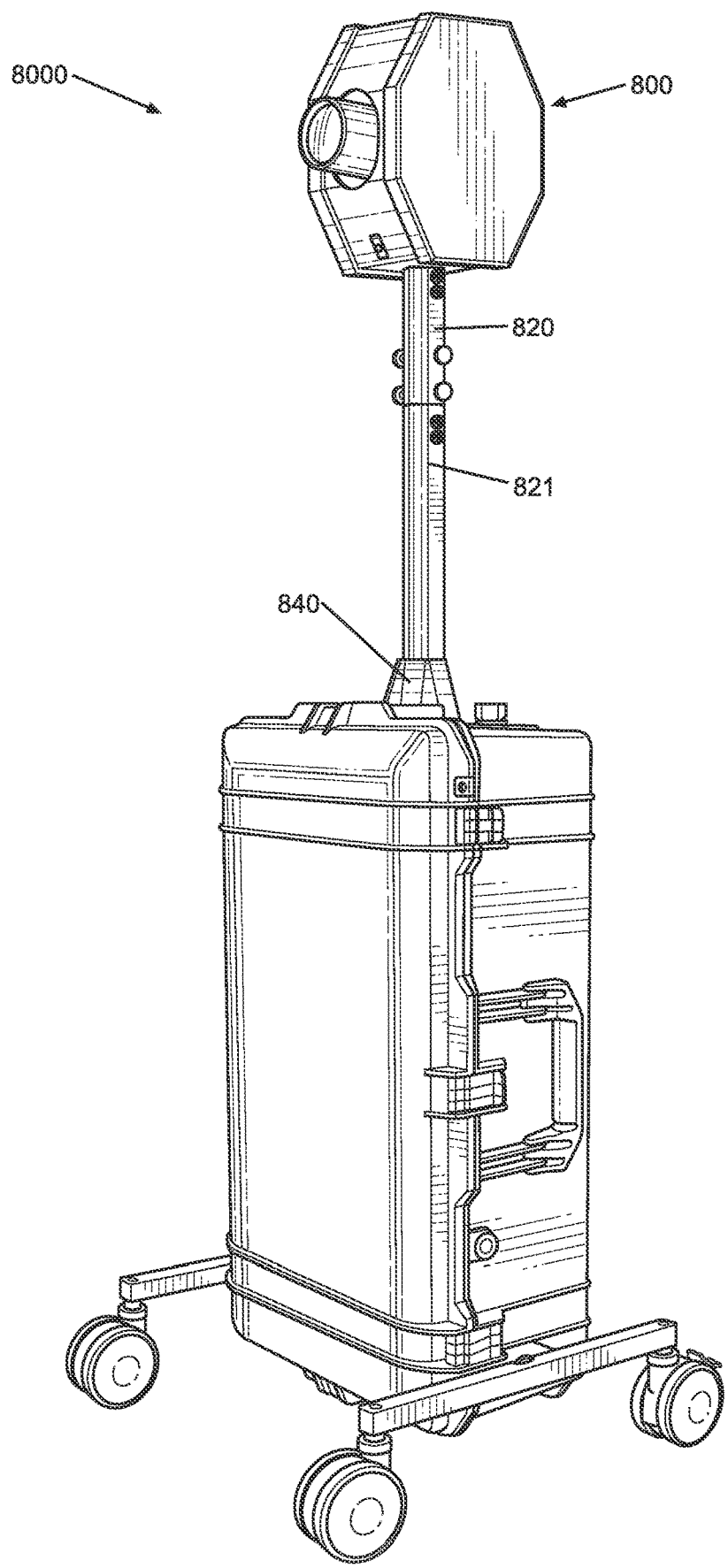
FIG. 7 illustrates a perspective view of a rapid inventory imaging system according to the second embodiment of the present invention.

FIG. 7 illustrates the fully assembled rapid inventory imaging system 2000. Camera unit 800 is removably mounted on the upper camera extension 820. An opening in the bottom panel 805 is threaded to form a female receiving opening for the camera unit 800. The upper camera extension 820 is a stainless steel tube which attaches to lower camera extension 821 at its bottom end, and is threaded at the top end and configured to mate with the receiving opening for the camera unit 800 in a male-female connection mechanism. The lower camera extension 821 has a sturdy base 840 which provides support to the camera extensions. Although the camera extensions 820 and 821 are made with stainless steel in this embodiment, it should be appreciated that any other suitable materials may be used. The bottom end of the lower camera extension 821 is removably mounted in the suitcase carrier 300.

Figure 8:
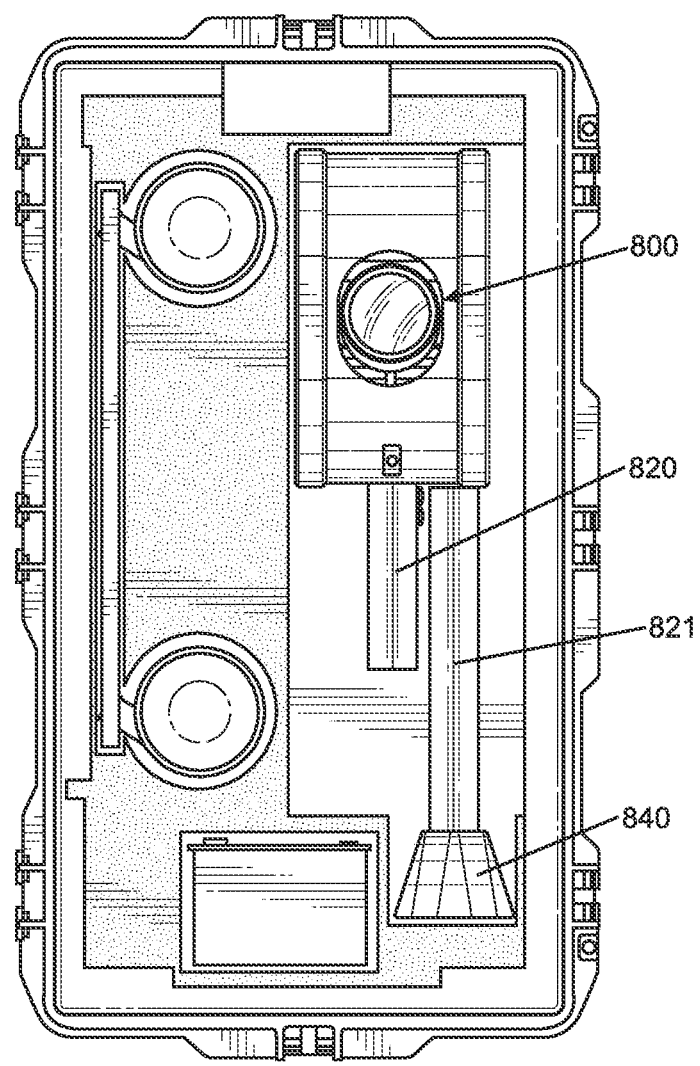
FIG. 8 illustrates a front view of an open suitcase carrier housing the parts of the rapid inventory imaging system of FIG. 7.
Figure 9:
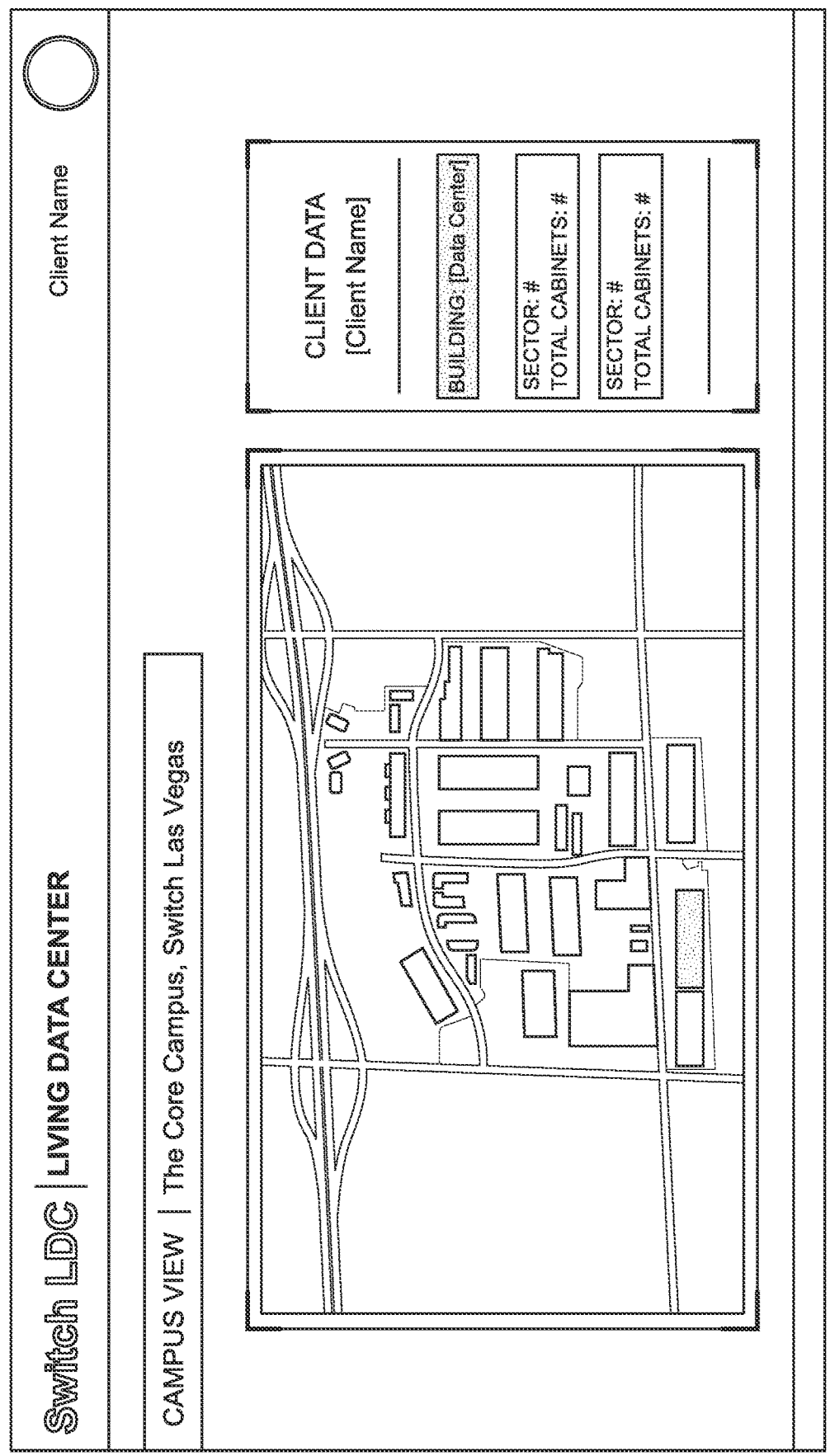
FIG. 9 illustrates a user interface graphic of camera software indicating physical location of inventory according to the present invention.
Figure 10:
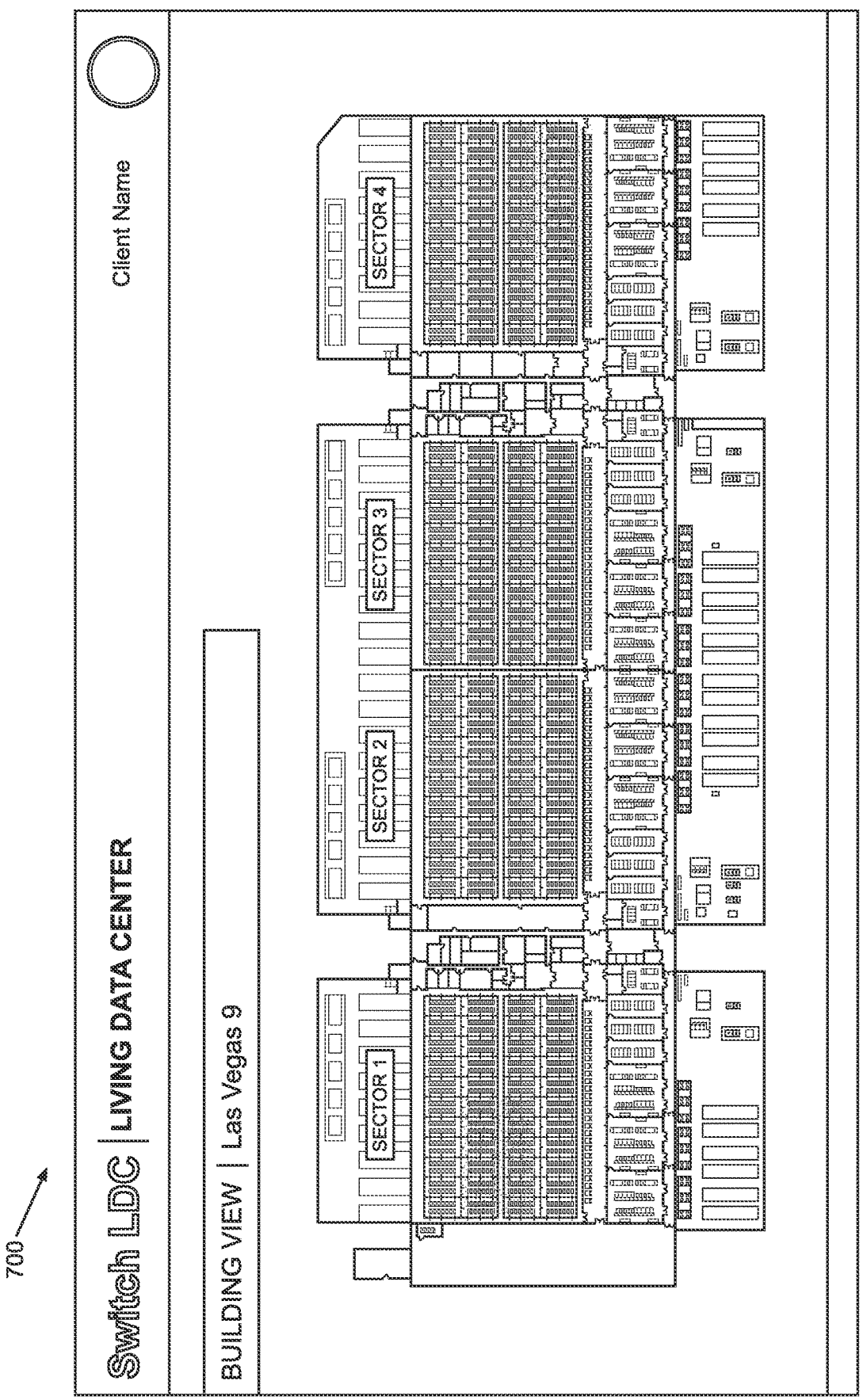
FIG. 10 illustrates a user interface graphic of camera software indicating internal facility location of inventory according to the present invention.
Figure 11:
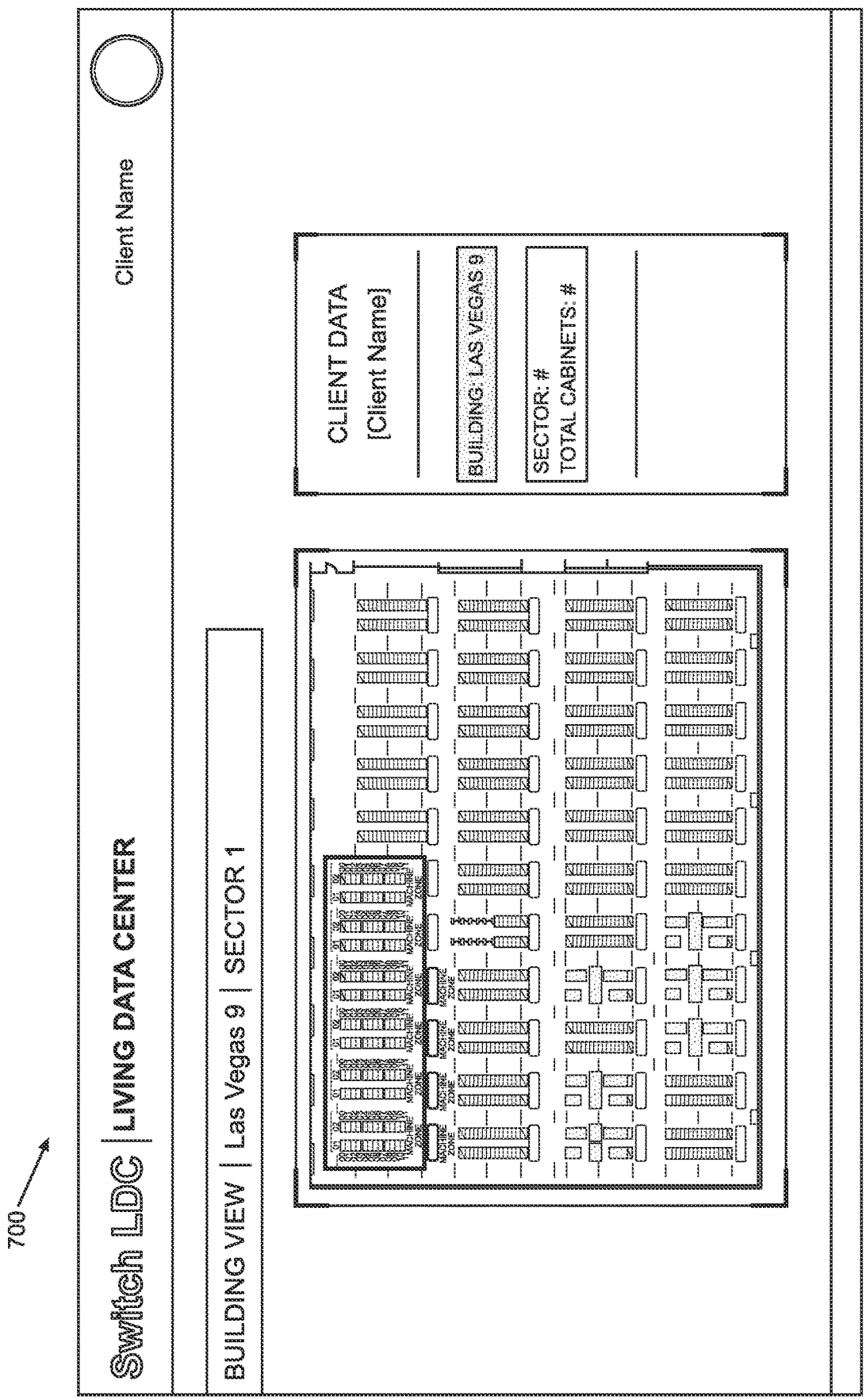
FIG. 11 illustrates a user interface graphic of camera software indicating internal facility location of inventory according to the present invention.
Figure 12:
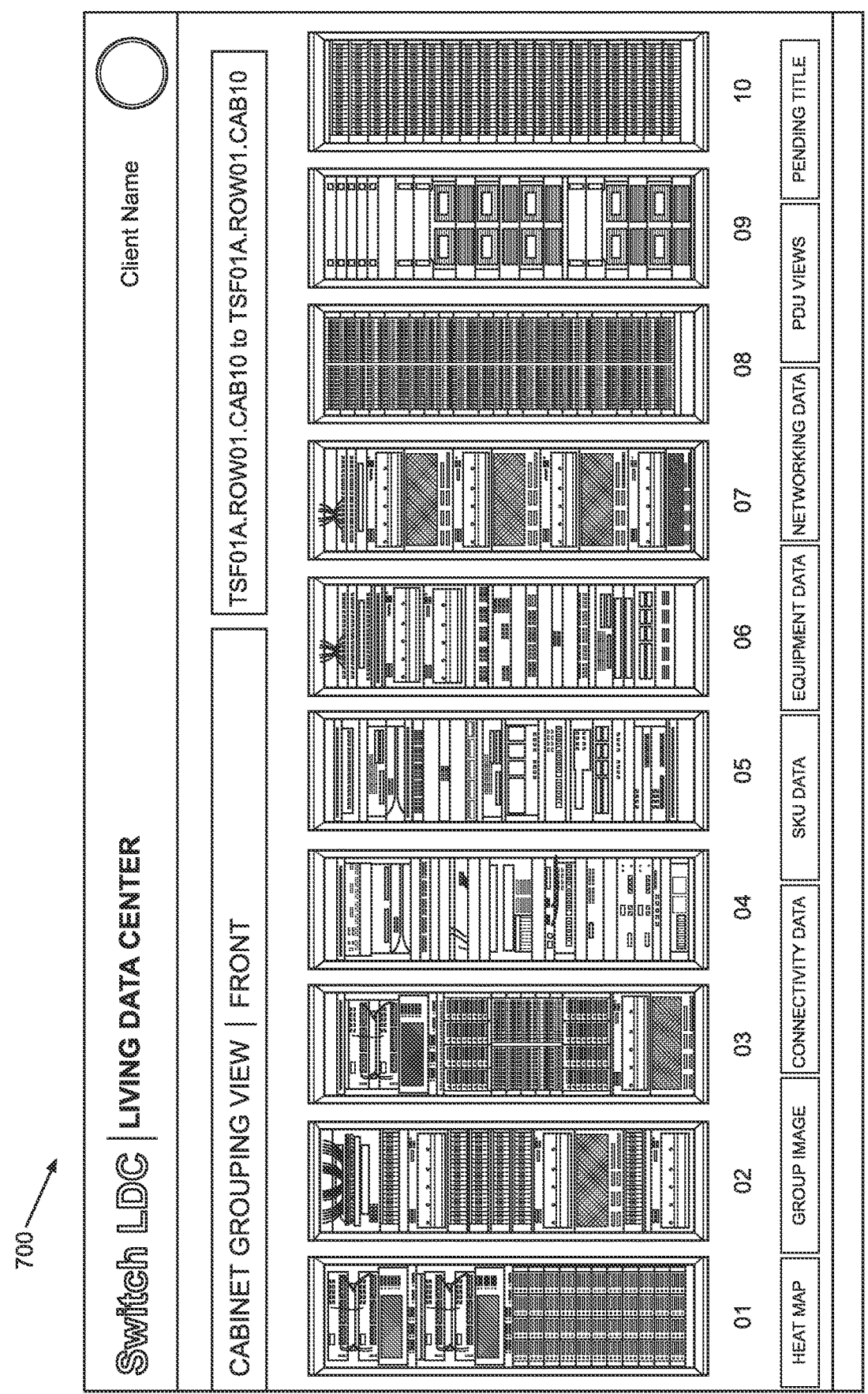
FIG. 12 illustrates a user interface graphic of electronic equipment stored in cabinets captured and stored by a rapid inventory imaging system according to the present invention.
Figure 13:
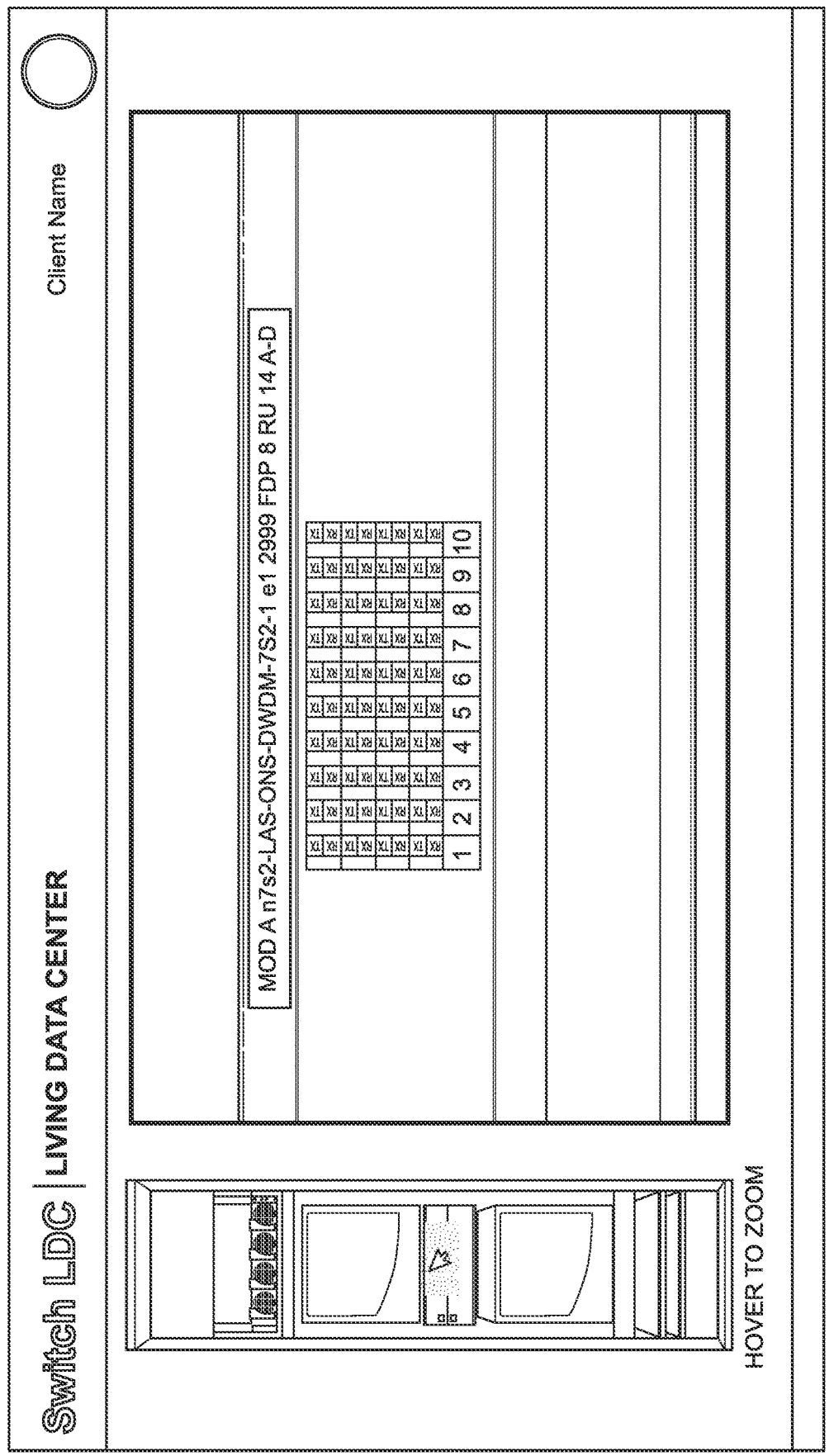
FIG. 13 illustrates a user interface graphic highlighting a specific surface region of electronic equipment in cabinets captured and stored by a rapid inventory imaging system according to the present invention.
Figure 14:
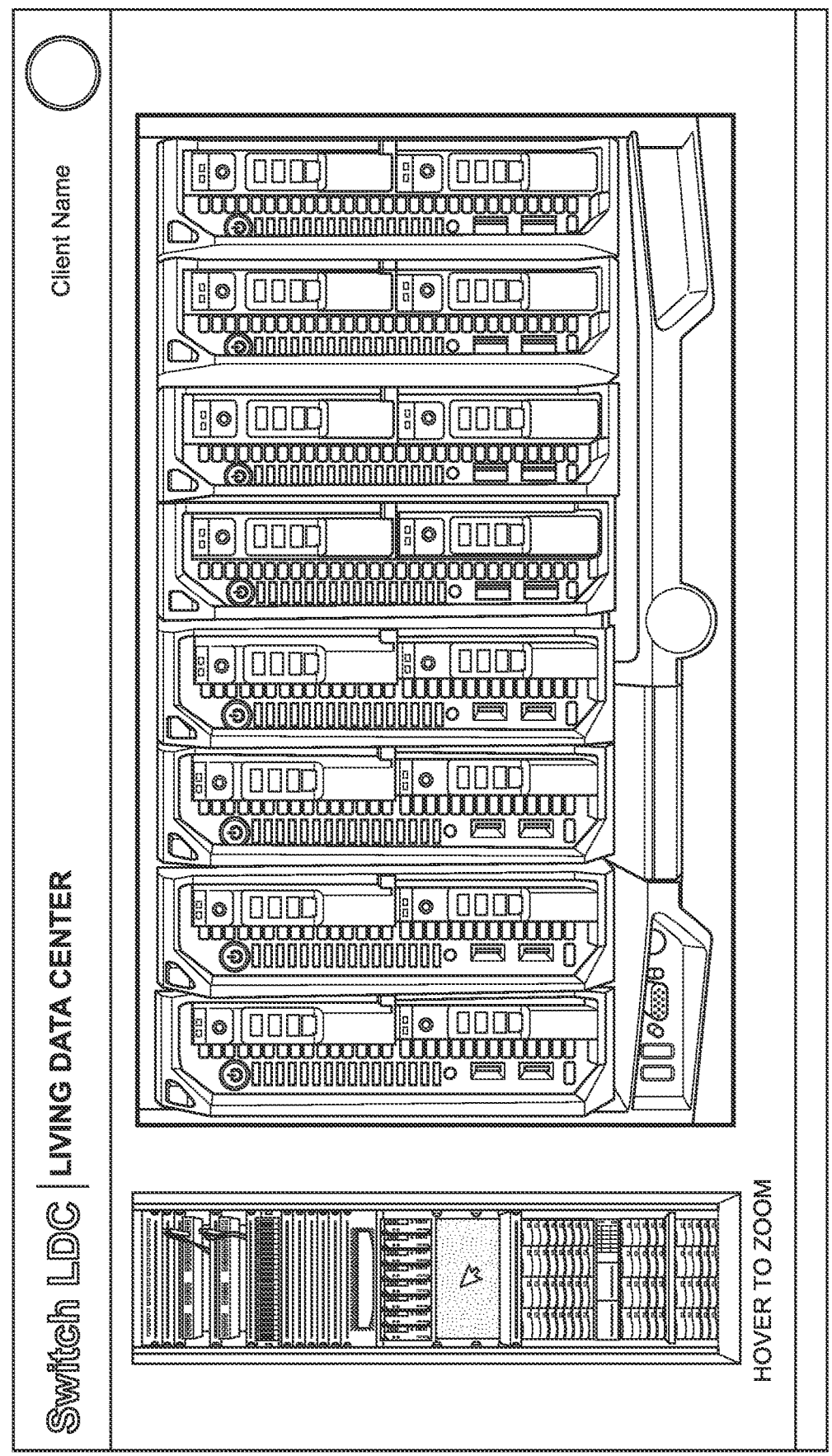
FIG. 14 illustrates another user interface graphic highlighting a specific surface region of electronic equipment in cabinets captured and stored by a rapid inventory imaging system according to the present invention.
Figure 15:
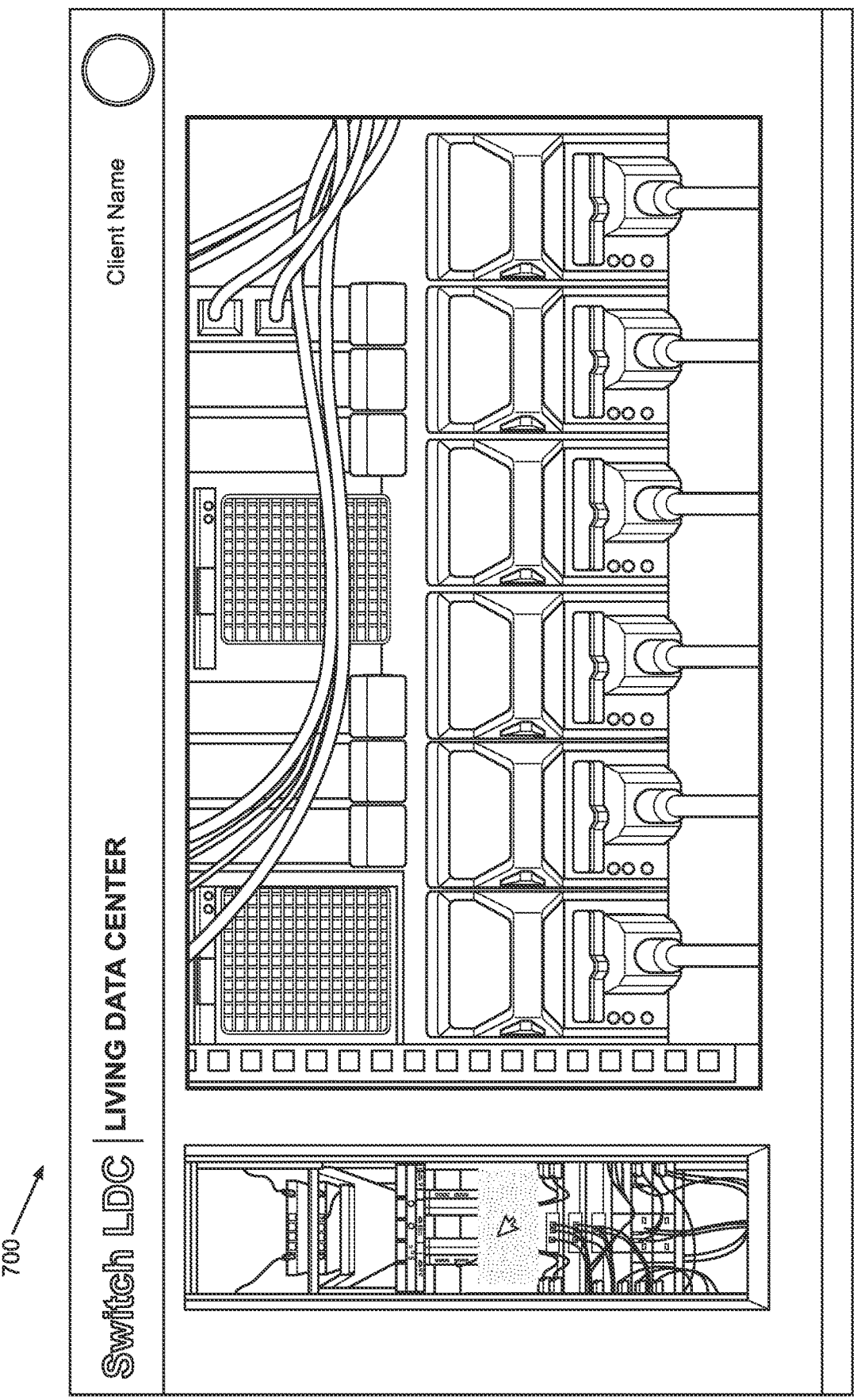
FIG. 15 illustrates another user interface graphic highlighting a specific surface region of electronic equipment in cabinets captured and stored by a rapid inventory imaging system according to the present invention.

FIG. 8 illustrates an embodiment of an internal configuration of the parts of the rapid inventory imaging system 8000 prior to assembly of the assembled configuration illustrated in FIG. 7. FIG. 8 shows the camera unit 800, camera extensions 820/821, wheel assembly 400, and the power and computing unit 500 are held in place within the suitcase carrier 300 by foam 600.

One particular method of using the embodiment of the rapid inventory imaging system 8000 illustrated in FIGS. 5-8 is described as follows: A user takes possession of the un-assembled rapid inventory imaging system 8000 as depicted in FIG. 8. The user typically intends to take inventory of some quantity of goods or equipment, such as canned or boxed foods at a grocery store, boxed goods at a retail store, or computer servers and equipment in a data center facility. Likewise, the intended imaging targets may be shelves of goods or equipment or electronic equipment in server cabinets of a data center. The user opens the suitcase carrier 300 by unlatching the latches 302a-302e. The user removes the camera unit 800, the extensions 820/821, and the wheel assembly 400 from the protective foam 600 of suitcase carrier 300. The power and computing unit 500 remains within the suitcase carrier 300. The user attaches the extensions to each other, then the upper camera extension 820 is attached to the camera unit 800 by screwing one end of the upper camera extension into the camera unit or by other suitable attachment mechanisms. The user attaches the bottom end of lower camera extension 821 to the suitcase carrier 300 by screwing the base 840 into the suitcase carrier or by other suitable attachment mechanisms. The assembled rapid inventory imaging system 8000, as depicted in FIG. 7, is placed on a floor adjacent to the imaging target. The system 8000 is guided into an optimal position where the camera unit lens 801 is approximately 28-32 inches away from the imaging target by pushing the system 8000 across the floor on wheel pairs 402a and 402b.

The user powers on the assembled rapid inventory imaging system 8000 to cause power to be provided from the power and computing unit 500 to the camera unit 800. Powering on the system 8000 also activates a Wi-Fi signal from the power and computing unit 500's antenna. The user controls the camera's operation using an application interface with camera system software 700. The application interface may be downloaded onto the user's cellular phone or may come pre-installed on a cellular phone, tablet, laptop, or other hardware device provided with the system 8000. When the rapid inventory imaging system 8000 is powered on and positioned approximately 28-32 inches from the imaging target, the user may instruct the camera system software to activate the positioning laser 806. The positioning laser projects vertical and horizontal streams of light onto the target surface. If the positioning laser is positioned substantially away from a midpoint of the imaging target's width, the user may reposition the entire system 8000 by pushing the system into proper position on the floor. When the lasers indicate the system 8000 is properly positioned, the user presses the wheel stoppers 403a and 403b into a locked position to lock the wheel pairs 402a and 402b in place, thereby preventing the system from moving on the floor.

After positioning the system 8000 in the desired location relative to the imaging target, the user inputs signals to instruct the camera system software 700 to capture the image of the target. When the camera system software 700 receives the signal to capture the image, the software instructs the LED lights to illuminate the target's surface and causes the lens of camera 801 to auto-focus.

After the lens are focused, and the target image is illuminated, the camera 801 captures a curved, panoramic, image of the imaging target by translating the gear 813 along the track 812, which rotates the camera 801 along a+/−21.5 degree. path relative to the floor. The camera 801 sends the captured image data to the hard drive of the power and computing unit 500 or transmits the image to a cloud storage unit through cellular or Wi-Fi connection. The camera captures an image while the surface of the imaging target is illuminated by the LED strips.

When the power and computing unit 500 receives the image data taken by the camera unit 100, the camera system software 700 flattens the image into a single, high-definition image that fully captures the height and width of the imaging target. In some embodiments of the system 8000's method of use, imaging targets may be 4 feet to 9 feet in height. In some embodiments of the system 8000's method of use, imaging targets may be 1 foot to 15 feet in width. In a preferred embodiment of the system 8000's method of use, the imaging target is of the approximate dimensions of server cabinets used to store servers and other electronics equipment in a data center or co-location facility. The camera system software 700 processes the images by flattening the curved image into a single, seamless, high definition image without distortion of the imaging target's dimensions. When the camera system software 700 completes the image flattening process, the image is then stored in the memory of the power and computing unit 500. As an alternative, or in addition to storing the composite image in the memory of the power and computing unit 500, the image may be uploaded into cloud storage. As an alternative, or in addition to storing the composite image in the memory of the power and computing unit 500, the image may be sent to and stored on the user's cellular phone. As an alternative, or in addition to storing the composite image in the memory of the power and computing unit 500, the image may be sent to and stored on any external hard drive of the user chooses.

In a preferred embodiment of the rapid inventory imaging system 8000, the camera system software 700 scans the composite image for identifying information. Identifying information may include but is not limited to brand names, product names, bar codes, product numbers, serial numbers, dates, expiration dates, mass and/or volumetric data, ingredient lists, nutritional facts, pricing information, weights, logos, telephone numbers, email addresses, website addresses, physical addresses, manufacturer information, indications of hazards, shelf-life indicators, warning labels, etc. The camera system software 700 identifies, captures, and sorts this information into a stored database unique to the user inputting the data by capturing the target images. In an embodiment wherein the camera system software 700 identifies, captures, and sorts information related to servers and computer equipment in a data center or co-location facility, the user may then remotely access the information it has captured and stored to keep track of the type and location of equipment it has deployed in a particular location; to assess the value and depreciation of value of its equipment; to identify properly and improperly installed equipment; to identify properly and improperly functioning equipment; to identify aging equipment due for replacement; to find and/or locate a particular piece of equipment; and/or to track brand names, product names, bar codes, product numbers, serial numbers, dates, expiration dates, mass and/or volumetric data, ingredient lists, nutritional facts, pricing information, weights, logos, telephone numbers, email addresses, website addresses, physical addresses, manufacturer information, indications of hazards, shelf-life indicators, and/or warnings related to its equipment.

Although the present invention has been particularly described with reference to embodiments thereof, it should be readily apparent to those of ordinary skill in the art that various changes, modification and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures.

What is claimed is:

1. An apparatus for capturing and categorizing data from the surface of electronic equipment stored within a server cabinet comprising:

a camera stored within a housing, the housing mounted to a portable carrying case provided with a handle;

a camera mount holding the camera to guide the camera along a path, the camera mount comprising a gear;

teeth of the gear meshed within teeth of a track inside the housing without any intermediate components, the gear being configured to translate along the track from a first end of the track to a second end of the track such that the gear moves in a constant concave manner facing the camera mount;

a laser configured to assist a user with properly positioning the camera relative to the server cabinet; and the camera capturing an image of the contents of the server cabinet within a data center when the camera mount translates along the track inside the housing.

2. The apparatus of claim 1, wherein upon activation the camera rotates+/−21.5° relative to a horizontal axis parallel to the floor.

3. The apparatus of claim 1, wherein the camera has a 20-24 mm lens.

4. The apparatus of claim 1, wherein the positioning laser projects a vertical line and a horizontal line.

5. The apparatus of claim 1, further comprising an array of LED lights to project light onto the contents of the server cabinet.

6. The apparatus of claim 1, wherein the camera is a 28 megapixel camera.

7. The apparatus of claim 1, wherein the captured image contains the entire contents of the server cabinet.

8. The apparatus of claim 1, further comprising a software system on computer readable media which flattens the captured image.

9. The apparatus of claim 8, wherein the software system extracts data and processes data from the image.

10. A process for capturing and categorizing data from the surface of electronic equipment stored within server cabinets comprising the steps of:

providing a camera stored within a housing;

mounting the housing to a portable carrying case provided with a handle;

providing a camera mount holding the camera to guide the camera along an arced path, the camera mount comprising a gear;

providing a track inside the housing, the track having teeth meshed with the teeth of the gear without any intermediate components, the gear being configured to translate along the track from a first end of the track to a second end of the track such that the gear moves in a constant concave manner facing the camera mount;

positioning a laser on the housing to assist a user with properly positioning the camera relative to a server cabinet located inside of a data center;

positioning the camera near the server cabinet; and activating the camera to translate the camera along the arced path as the gear translates along the track to capture an image of the entire contents of the server cabinet.

11. The process of claim 10, wherein upon activation the camera rotates+/−21.5° along the arced path relative to a horizontal axis parallel to the floor.

12. The process of claim 10, wherein the camera has a 20-24 mm lens.

13. The process of claim 10, further comprising the step of projecting a vertical line and a horizontal line from the laser to assist with properly positioning the camera relative to the server cabinet.

14. The process of claim 10, further comprising the step of affixing an array of LED lights to the surface of the housing and illuminating the LED lights to project light onto the contents of the server cabinet.

15. The process of claim 10, wherein the camera is a 28 megapixel camera.

16. The process of claim 10, further comprising the step of using a software system on computer readable media to activate the camera and flatten the captured image.

17. The process of claim 16, further comprising the step of using the software system to extract and process data from the image.

18. The apparatus of claim 1, wherein the gear comprises a disc-shaped portion, and wherein the teeth of the gear extend from and surround the disc-shaped portion.

\* \* \* \* \*